UNITED STATES PATENT OFFICE.

JOHN MARCH, OF WHITE OAK SPRINGS, WISCONSIN, ASSIGNOR TO THE JOHN MARCH COMPANY, OF WISCONSIN.

METHOD OF SUPPRESSING HORNS IN CATTLE.

SPECIFICATION forming part of Letters Patent No. 478,877, dated July 12, 1892.

Application filed December 8, 1888. Serial No. 293,028. (No specimens.)

*To all whom it may concern:*

Be it known that I, JOHN MARCH, of White Oak Springs, in the county of Lafayette and State of Wisconsin, have invented certain Improvements in the Method of Suppressing Horns in Cattle, of which the following is a specification.

At the present day stock-raisers and veterinary surgeons recognize for many reasons the advantage of having neat cattle hornless, and it is now a common practice to remove the horns of cows and oxen.

The object of my invention is to avoid the troubles and dangers attending the removal of the fully-developed horn; and to this end it consists in effecting by chemical means the suppression of the horns while still in an embryotic or incipient stage. I have found after many experiments that it is possible by properly treating the young horn to arrest its growth, and this without in any way affecting or impairing the health or appearance of the animal in other respects. I have found that various chemicals and chemical compounds may be employed to accomplish my end. I recommend, however, the following composition of matter: concentrated potash, one hundred parts; water, one hundred and ninety parts; logwood, ten parts. The essential element of the composition is the potash, which may be used without logwood and of any suitable degree of attenuation.

In practice I commonly make use of the solution when the animal is from one to ten days of age. It is simply applied externally to the young or incipient horn by means of a brush or other instrument, and in most cases I find that a single application is sufficient to answer the purpose in view.

Under my method it is unnecessary to remove the young horn or any portion of the same or to subject the animal to any mechanical or surgical treatment whatever either before or after the application of the potash.

I believe myself to be the first to discover the fact that the growth of the horn may be arrested solely by the external application of a chemical without removing the horn or any portion thereof and without the application of heat.

Having thus described my invention, what I claim is—

1. The improvement in the art of suppressing horns in cattle, consisting in applying to the incipient horn a substance, substantially as described, to check its growth.

2. The improvement in the art of suppressing or eliminating horns in cattle, consisting in treating the incipient horn with potash, substantially as herein described.

In testimony whereof I hereunto set my hand, this 1st day of December, 1888, in the presence of two attesting witnesses.

JOHN MARCH.

Witnesses:
GEO. E. WEATHERBY,
A. GREEN.